May 31, 1938. C. G. SEYFERTH 2,119,249
LANDING GEAR
Original Filed March 8, 1937
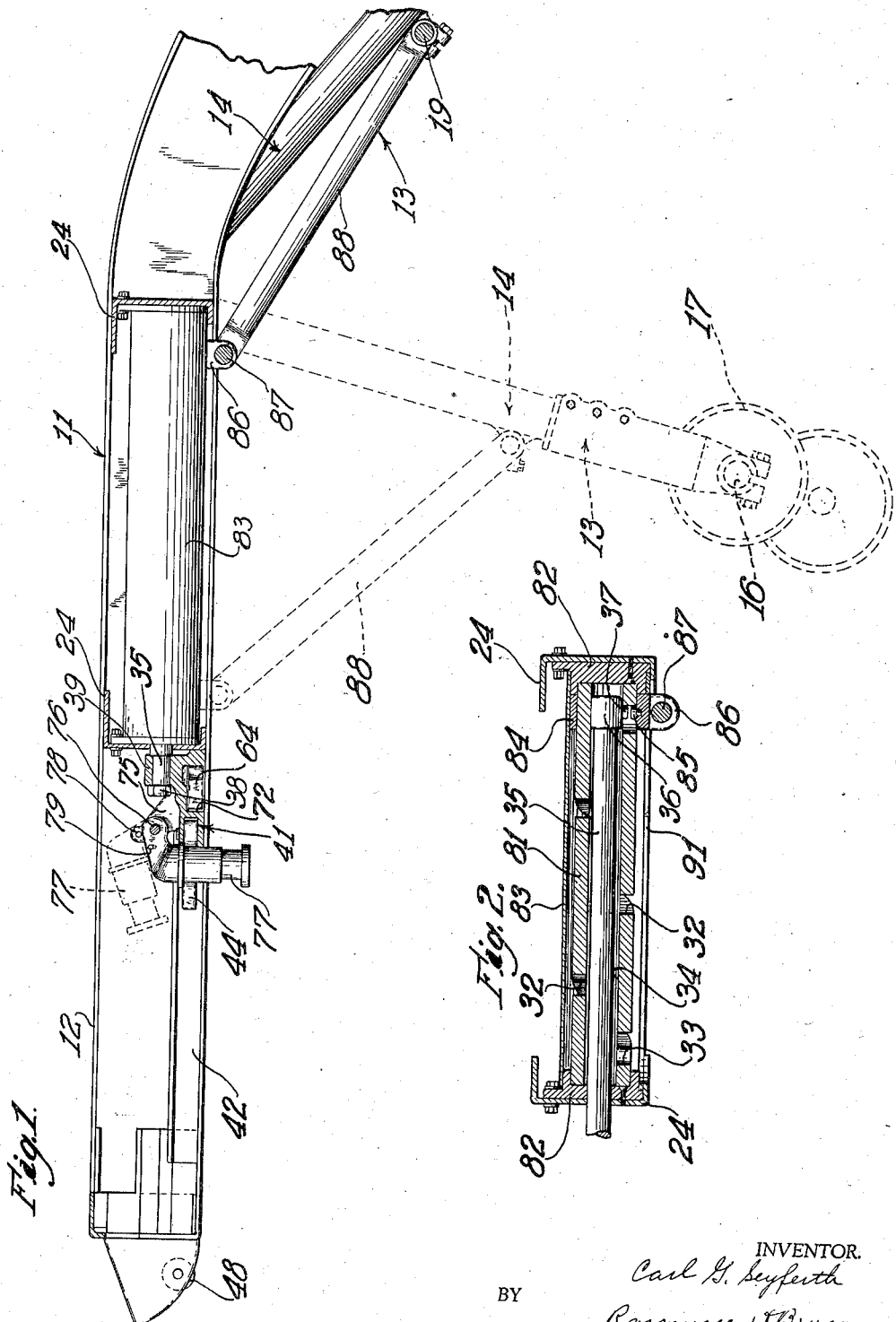
INVENTOR.
Carl G. Seyferth
BY
Rasmussen & Brugman
ATTORNEYS.

Patented May 31, 1938

2,119,249

UNITED STATES PATENT OFFICE 2,119,249

LANDING GEAR

Carl G. Seyferth, Muskegon, Mich.

Original application March 8, 1937, Serial No. 129,599. Divided and this application April 23, 1937, Serial No. 138,522

5 Claims. (Cl. 280—33.1)

This invention relates in general to landing gear, and has more particular reference to an automatically retractable landing gear for semi-trailers and the like, such as that disclosed in my co-pending application, Serial No. 129,599, filed March 8, 1937, of which the instant application is a division.

A principal object of the invention is the provision in a landing gear for semi-trailers of novel means for moving the trailer supporting mechanism between operative and inoperative positions during uncoupling or coupling operations of the semi-trailer and tractor.

More specifically, the invention contemplates the provision of coupling mechanism on a trailer which is adapted to be readily engaged by coupling mechanism on a tractor to be moved thereby relative to the trailer during coupling and uncoupling operations, and of novel connections between such movable trailer coupling mechanism and a longitudinally disposed shaft on the trailer which is rotatable to raise and lower the landing gear.

Numerous other objects and advantages of the invention will be apparent as it is better understood from the following description, which, when taken in connection with the accompanying drawing, discloses a preferred embodiment thereof.

In the drawing,

Figure 1 is a longitudinal vertical sectional view, with parts broken away, of a trailer fifth wheel and landing mechanism embodying the features of the instant invention, with the landing gear shown in operative position in broken lines; and Fig. 2 is a detail vertical sectional view of the connecting mechanism between the fifth wheel and the landing gear proper of Fig. 1.

Referring more particularly to the drawing, reference numeral 11 indicates in general a trailer or a semi-trailer vehicle having side frames 12, and which is provided adjacent its forward end with a retractable landing gear 13 of the swinging type. The landing gear 13 comprises a pair of adjustable wheel carrying members 14 hingedly connected at their upper ends in the usual manner to the frame members 12 of the trailer, and interconnected at their lower ends by a cross shaft 16 which rotatably supports the usual wheels 17 at its outer ends. A forked or radius rod 88 is pivotally mounted at its spaced, lower ends upon a cross shaft 19 which is connected adjacent its ends to the members 14, and the converged, upper end of the radius rod 88 is pivotally mounted upon a stub shaft 87.

The stub shaft 87 is journaled in a bracket 86 which is preferably formed integrally with and depends from a collar member 84 embracing and mounted for sliding movement upon a longitudinally disposed shaft 81. The shaft 81 is journalled for rotation and held against axial movement by a pair of bearing brackets 82 which are secured in any suitable manner to cross frame members 24 of the trailer 11. The shaft 81 is provided with a helical groove or slot 32 of relatively long pitch, which terminates at its ends adjacent the end portions of the shaft 81 in longitudinally disposed slots or dwells 33. The shaft 81 is also provided with an axial bore 34 which communicates with the grooves 32 and 33. The bearing members 82 have the ends of a hollow tube or cover member 83 secured thereto which surrounds the shaft 81 in spaced, concentric relationship thereto.

A longitudinally extending shaft 35 is disposed within the bore 34 of the shaft 81 and extends forwardly through the forward bearing member 82 and cross frame member 24. The rearward end of the shaft 35 terminates in a slightly enlarged portion 36 having a sliding fit in the bore 34, and which is provided with a radially extending lug 37 rigidly secured thereto or formed integrally therewith. The lug 37 is disposed within the slots 32, 33 so that longitudinal movement of the shaft 35 will rotate the shaft 28. The collar member 84 which slidably embraces the shaft 81 is provided on its inner, lower surface with a radially disposed lug 85 which extends upwardly into the slot 32, 33 of the shaft 81 in radial alinement with the lug 37 on the enlarged portion 36 of the shaft 35. It will thus be apparent that rotation of the shaft 81 will result in longitudinal movement of the collar 84 thereon to move the landing gear 13 between its inoperative or full line position of Fig. 1 and its operative or broken line position of Fig. 1. A longitudinal slot 91 is provided in the lower surface of the cover member 83 through which the bracket portion 85 of the collar 84 extends to permit such longitudinal movement of the latter relative to the cover member.

The forward end of the shaft 35 is rigidly secured by means of a suitable nut 38 to a bracket 39 which is upstanding from and formed integrally with a slidable plate member indicated generally by reference numeral 41 (Fig. 1). The plate member 41 is supported between and guided for longitudinal movement by a pair of channel members 42 rigidly secured in any suitable manner to the frame of the trailer 11. Pivotally secured to the forward end of the plate member 41 are a pair of movable jaw members 44.

The jaw members 44 constitute a part of the fifth wheel or coupling mechanism of the trailer, which mechanism is shown in the instant case as being convertible so as to be operable by either male or female fifth wheel coupling mechanism on the tractor. In coupling and uncoupling operations between the tractor and trailer vehicles, suitable rollers 48 provided at the forward end of the frame of the trailer 11 are adapted to engage the upper surface of the tractor fifth wheel to move the forward end of the trailer vertically into proper horizontal position in the usual and well known manner. When a male tractor fifth wheel mechanism is employed, the movable jaw members 44 are adapted to engage the usual king pin provided on the tractor fifth wheel to be moved longitudinally relative to the frame of the trailer in coupling and uncoupling operations. In the fully coupled position, the trailer fifth wheel mechanism 41 is adapted to be locked in its position of Fig. 1 by a latch bar 64 engaging within a suitable recess 72 therein in the usual and well known manner.

The following optionally useable mechanism forms a part of the trailer fifth wheel mechanism for use with a tractor female coupling mechanism. The plate 41 is provided with an integral, upstanding bracket member 75 extending forwardly from and adjacent to the bracket 39. A pivot pin 76 is carried by the bracket 75 upon which is pivotally mounted a king pin 77 which is adapted to be swung downwardly into its vertical or full line position of Fig. 1, where it is locked by the movable jaw members 44. Since the channel members 42 maintain the jaws 44 in closed or king pin engaging position in all but their extreme forward position, the adjustment of the king pin 77 between its operative and inoperative positions, as shown in full and broken lines, respectively, in Fig. 1, must be made when the trailer fifth wheel mechanism is in its forward or uncoupled position, in which position the landing gear 13 assumes its extended position, as shown in broken lines in Fig. 1. The bracket 75 is provided with an upstanding portion within which is journalled a horizontally disposed pin or latching member 78 which is adapted to engage within a suitable aperture 79 in the upper portion of the king pin 77 when the latter is in its inoperative or broken line position of Fig. 1 to retain the king pin in such raised position.

Assuming the tractor and trailer vehicles to be coupled together, at which time the trailer fifth wheel mechanism and landing gear will be in their rearward or full line positions of Fig. 1 (the tractor and its fifth wheel mechanism not being shown), an uncoupling operation of the vehicles is accomplished in the following manner. The latch bar is first withdrawn laterally from the recess 72 of the plate 41 to unlock the trailer coupling mechanism in the usual manner, which results in the trailer brakes being set, as is well known. The tractor is then driven forwardly relative to the trailer. In such movement of the tractor, the fifth wheel or coupling mechanism of the trailer, including the plate 41 and bracket 39, is moved forwardly (to the left in the drawing) relative to the frame of the trailer. This results in forward longitudinal movement of the shaft 35 relative to the shaft 81. Since the shaft 35 is held against rotation by the nut 38, or any other suitable means, such longitudinal movement thereof rotates the shaft 81 in a clockwise direction, as viewed from the front of the trailer, through the agency of the lug 37 and the helical groove 32. This rotation of the shaft 81 causes forward sliding movement of the collar member 84 thereon due to the lug 85 of the collar member engaging within the groove 32. Such forward movement of the collar member 84 swings the landing gear 13 from its full line position to its broken line position of Fig. 1.

The above described lowering action of the landing gear 13 is completed while the rollers 48 at the forward end of the trailer are still in engagement with the upper surface of the tractor fifth wheel, so that the landing gear is in operative position to perform its function of supporting the front end of the trailer before the tractor fifth wheel mechanism has been moved from under the latter. In a coupling operation of the two vehicles, the reverse of the above described operative takes place. The tractor is backed under the front end of the trailer to relieve the landing gear of its supporting function. Further backward movement of the tractor relative to the trailer results in rearward movement of the trailer coupling mechanism relative to the trailer frame until it reaches its position of Fig. 1 wherein it is automatically locked by the latch bar 64 in well known manner. During such rearward movement of the coupling mechanism relative to the trailer frame, the shaft 35 is moved rearwardly relative to the shaft 81 to rotate the latter in a counter-clockwise direction, when viewed from the front of the trailer. Such rotation of the shaft 81 causes a rearward sliding movement of the collar member 84 thereon to raise the landing gear 13 from its broken line position to its inoperative or full line position of Fig. 1.

The longitudinally disposed slots or dwells 33 at the ends of the helical groove 32 function in conjunction with the lug 85 of the collar member 84 to retain the landing gear 13 in its operative or inoperative positions against accidental displacement therefrom. The cover member 83 prevents the accumulation of dirt and other foreign matter in the grooves 32, 33 and the bore 34 of the shaft 81. It will thus be apparent that a novel mechanism of durable yet simplified construction is provided for interconnecting the movable coupling mechanism of the trailer and the landing gear so that the latter is operated automatically in coupling and uncoupling operations of the tractor and trailer.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a control means for landing gear, a shaft mounted for rotation and having an axial bore and a helical slot in the walls thereof, means disposed within said bore and operably associated with said helical slot for rotating said shaft upon reciprocation thereof, means mounted on said shaft for co-operating with said slot to be reciprocated thereby upon rotation of the shaft, and means interconnecting said last named means and the landing gear for moving the latter between operative and inoperative positions.

2. In a control means for landing gear, a shaft mounted for rotation and having an axial bore and a helical slot in the walls thereof, a second shaft disposed within the bore of said first shaft and having means co-operating with said slot for imparting rotation to said first shaft upon reciprocation of said second shaft, a collar mounted for sliding movement on said first shaft and having means co-operating with said slot whereby said collar is reciprocated upon rotation of said first shaft, and means interconnecting said collar and the landing gear for moving the latter between operative and inoperative positions.

3. In a control means for landing gear, a shaft mounted for rotation and having an axial bore and a helical slot in the walls thereof, means mounted on said shaft for co-operating with said slot to be reciprocated thereby upon rotation of the shaft, means interconnecting said last named means and the landing gear for moving the latter between operative and inoperative positions, reciprocating means disposed within said axial bore and operably associated with said helical slot whereby movement of said reciprocating means causes rotation of said shaft to operate said landing gear, and means associated with said reciprocating means for locking it against movement when the landing gear is in inoperative position.

4. In a control means for landing gear, a shaft mounted for rotation and having an axial bore and a helical slot in the walls thereof, means mounted on said shaft for co-operating with said slot to be reciprocated thereby upon rotation of the shaft, means interconnecting said last named means and the landing gear for moving the latter between operative and inoperative positions, reciprocating means disposed within said axial bore and operably associated with said helical slot, whereby movement of said reciprocating means causes rotation of said shaft to operate said landing gear, and a casing member substantially enclosing said shaft for preventing the accumulation of foreign matter in said bore and said slot.

5. In a tractor-trailer vehicle having a swinging landing gear mounted on said trailer, a longitudinally disposed shaft mounted for rotation on the trailer having an axial bore therein and a helical slot formed in the walls thereof, a head member slidably mounted on said shaft having means co-operating with said helical slot for imparting longitudinal movement thereto upon rotation of said shaft, means interconnecting said head member and said landing gear for moving the latter between retracted and trailer supporting positions upon longitudinal movement of said head member, a second shaft disposed within the bore of said first shaft and having means co-operating with said helical groove for rotating said first shaft upon longitudinal movement of said second shaft, and fifth wheel mechanism mounted on said trailer, including coupling mechanism connected to said second shaft and adapted to be moved longitudinally relative to the trailer by fifth wheel coupling mechanism on the tractor during coupling and uncoupling operations of the vehicle, whereby said landing gear is moved between retracted and trailer supporting positions by said trailer fifth wheel mechanism.

CARL G. SEYFERTH.